R. B. BABB.
THRESHING MACHINE AND GRAIN SEPARATOR.
APPLICATION FILED JAN. 19, 1915.

1,140,237.

Patented May 18, 1915.

Inventor
R. B. Babb,
By Victor J. Evans
Attorney

Witnesses
J. H. Crawford

UNITED STATES PATENT OFFICE.

REASE B. BABB, OF BLACKWELL, OKLAHOMA.

THRESHING-MACHINE AND GRAIN-SEPARATOR.

1,140,237. Specification of Letters Patent. Patented May 18, 1915.

Application filed January 19, 1915. Serial No. 3,147.

*To all whom it may concern:*

Be it known that I, REASE B. BABB, a citizen of the United States, residing at Blackwell, in the county of Kay and State of Oklahoma, have invented new and useful Improvements in Threshing-Machines and Grain-Separators, of which the following is a specification.

This invention relates to threshing machines and grain separators. In this class of machines as generally constructed the cylinder teeth nearest the ends of the cylinder must be far enough from the end of the cylinder to permit the side plates of the concave to pass up between the said end teeth and the side walls of the separator. This implies an open space adjacent to each end of the cylinder of from one to one and one-half inches in width which will permit a large quantity of heads of grain to pass through such openings untouched and unthreshed, such heads passing to the straw stack.

The present invention has for its object to produce a guard member which will be attached to the side wall of the separator in such fashion that it will practically obstruct the opening between the side wall and the teeth nearest the end of the cylinder, thus preventing the passage of heads of grain and insuring thorough threshing and complete separation.

A further object of the invention is to produce a guard member having integral teeth that will be spaced from the side wall of the machine sufficiently to permit the side plates of the concave in the adjustment of the latter to pass between such teeth and the side wall, thus preventing interference with any proper and desired adjustment of the concave.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

Figure 1:
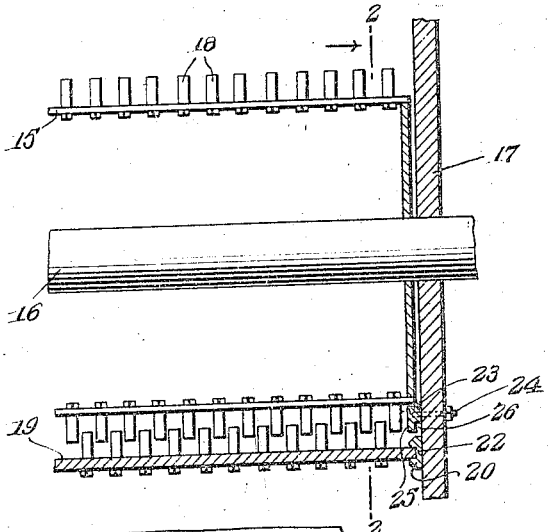
Figure 2:
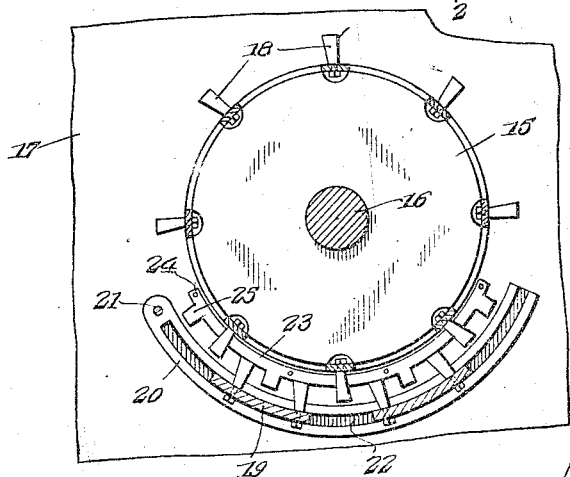
Figure 3:
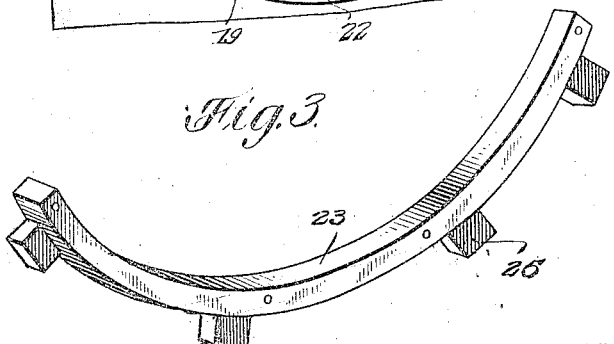

In the drawing,—Figure 1 is a sectional view taken transversely through a threshing cylinder and concave and showing a portion of the side wall of the separator casing. Fig. 2 is a sectional view taken on the line 2—2 in Fig. 1. Fig. 3 is a perspective view showing the guard member detached.

Corresponding parts in the several figures are denoted by like characters of reference.

The threshing cylinder 15 is secured on the shaft 16 which is mounted for rotation in the usual manner in the side walls of the separator casing, one of said side walls being shown at 17. The cylinder is equipped with the customary teeth 18. The concave includes the tooth carrying bars 19 which are supported at each end in a plate or bar 20, the same being pivoted at 21 on the side wall 17 of the separator, in rear of the cylinder, the forward ends of the side plates being free to swing vertically in order that the space between the tooth carrying bars and the cylinder may be varied according to the kind and condition of material that is to be threshed. Each bar or side plate 20 has a groove 22 forming a seat for the tooth carrying bars. The manner of adjusting and supporting the free end of the concave is not indicated, as it does not form a part of the present invention.

The teeth 18 nearest each end of the cylinder are necessarily spaced from the end of the cylinder sufficiently to enable the side plate or bar 20 of the concave to be moved upward between such teeth and the side wall of the cylinder when the teeth of the concave are to be moved in close relation to the cylinder. It follows that when the free end of the concave is dropped spaces of considerable area are left open between the teeth nearest the end of the cylinder and the proximate side wall of the casing, thereby permitting heads of grain to pass unthreshed. For the purpose of obstructing this space I provide the arcuate guard member 23 which is secured by means of fastening members, such as bolts 24, on the side wall of the casing in concentric relation to the cylinder and closely adjacent to the surface thereof. Said guard member is provided at intervals with radially extending teeth 25 which are formed integral therewith and which are positioned adjacent to the inner face of said guard member. A space 26 is thus left open between the opposed faces of the teeth 25 and the side wall 17, said space being sufficient for the admission of a portion of the side plate 20 of the concave, the vertical adjustment of which will thus be not materially interfered with by the presence of the guard member. The spaces formerly left open will thus be obstructed, and the teeth 25 of the guard member will coöperate with the teeth of the cylinder to effect threshing of the heads of grain passing therebetween.

Having thus described the invention, what is claimed as new, is:—

1. In a threshing machine, an arcuate guard plate secured on the side wall of the casing concentric with and in close relation to the lower portion of the cylinder to occupy the space between the end teeth of the cylinder and the side wall of the casing, said guard member having radially extending teeth.

2. In a threshing machine, an arcuate guard plate secured on the side wall of the casing concentric with and in close relation to the lower portion of the cylinder to occupy the space between the end teeth of the cylinder and the side wall of the casing, said guard member having radially extending teeth, said teeth being positioned adjacent to the inner face of the guard member to leave spaces between said teeth and the proximate face of the side wall of the casing.

3. In a threshing machine, a threshing cylinder, a concave including tooth carrying bars supported at each end by a plate pivoted on a side wall of the casing to the rearward of the cylinder, and a guard member consisting of an arcuate bar secured on the side wall of the casing closely adjacent to the lower portion of the cylinder and concentric therewith, said guard member having radially extending teeth that are spaced from the proximate side wall of the casing.

In testimony whereof I affix my signature in presence of two witnesses.

REASE B. BABB.

Witnesses:
T. J. SHORES,
S. F. HARRISON.